US012770315B2

(12) United States Patent
Chang

(10) Patent No.: US 12,770,315 B2
(45) Date of Patent: Oct. 20, 2026

(54) VIDEO PROCESSING METHOD AND APPARATUS, DEVICE, STORAGE MEDIUM, AND PRODUCT

(71) Applicant: Tencent Technology (Shenzhen) Company Limited, Shenzhen (CN)

(72) Inventor: Tianyuan Chang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 125 days.

(21) Appl. No.: 18/793,543

(22) Filed: Aug. 2, 2024

(65) Prior Publication Data

US 2024/0394947 A1 Nov. 28, 2024

Related U.S. Application Data

(63) Continuation of application No. PCT/CN2023/123919, filed on Oct. 11, 2023.

(30) Foreign Application Priority Data

Dec. 29, 2022 (CN) ......................... 202211700910.1

(51) Int. Cl.

*G06F 15/08* (2006.01)
*G06T 7/73* (2017.01)
*G06T 13/40* (2011.01)

(52) U.S. Cl.

CPC ................ *G06T 13/40* (2013.01); *G06T 7/75* (2017.01); *G06T 2207/10016* (2013.01); *G06T 2207/30008* (2013.01); *G06T 2207/30201* (2013.01)

(58) Field of Classification Search

CPC . G06T 13/40; G06T 7/75; G06T 2207/10016; G06T 2207/30008; G06T 2207/30201

See application file for complete search history.

(56) References Cited

U.S. PATENT DOCUMENTS 6,937,240 B2 * 8/2005 Sasaki ..................... A63F 13/10 345/475
9,191,579 B2 * 11/2015 Seidel .................... H04N 5/262
(Continued)

FOREIGN PATENT DOCUMENTS

CN 102467753 A 5/2012
CN 103021008 A 4/2013
(Continued)

OTHER PUBLICATIONS

Zingoni, Dealing with Rotation Matrices and Translation Vectors in Image-Based Applications, 2019, IEEE A&E Systems Magazine, pp. 38-53. (Year: 2019).*
(Continued)

*Primary Examiner* — Cheng Yuan Tseng
(74) *Attorney, Agent, or Firm* — Morgan, Lewis & Bockius LLP

(57) ABSTRACT

This application disclose a video processing method performed by a computer device. The method includes: obtaining a bone rotation and translation matrix of an object in a first video frame of a target video, predicting positions of the M vertices in a second video frame of the target video subsequent to the first video frame by using a bone weight matrix of the object and the bone rotation and translation matrix, to obtain predicted positions of the M vertices; alternatively updating the bone weight matrix and the bone rotation and translation matrix based on a difference between real positions of the M vertices in the second video frame and the predicted positions of the M vertices, to obtain a target bone weight matrix; and restoring the target video based on the target bone weight matrix and the bone rotation and translation matrix of the object in the target video.

18 Claims, 6 Drawing Sheets

(56) References Cited

U.S. PATENT DOCUMENTS

| | | | | |
|---|---|---|---|---|
| 10,417,829 | B2 * | 9/2019 | Kim | G06T 19/20 |
| 11,367,195 | B2 * | 6/2022 | Lv | G06T 7/11 |
| 11,836,841 | B2 * | 12/2023 | Zhang | G06V 20/46 |
| 12,101,457 | B2 * | 9/2024 | Ilola | G06T 5/80 |
| 12,205,333 | B2 * | 1/2025 | Schwarz | H04N 19/70 |
| 12,469,239 | B2 * | 11/2025 | Yang | G06V 10/761 |
| 12,511,848 | B2 * | 12/2025 | Guler | G06T 19/20 |
| 2008/0136814 | A1 * | 6/2008 | Chu | G06T 13/40 345/419 |
| 2010/0271368 | A1 * | 10/2010 | McNamara | G06T 17/00 345/420 |
| 2023/0171427 | A1 * | 6/2023 | Bachhuber | H04N 19/177 375/240.12 |
| 2023/0267666 | A1 * | 8/2023 | Minor | G06N 3/04 345/419 |
| 2024/0127541 | A1 * | 4/2024 | E | G06T 19/20 |
| 2024/0394947 | A1 * | 11/2024 | Chang | G06T 7/70 |
| 2025/0139885 | A1 * | 5/2025 | Zhang | G06T 15/00 |
| 2025/0225709 | A1 * | 7/2025 | Zhang | G06T 13/40 |

FOREIGN PATENT DOCUMENTS

| | | | | | |
|---|---|---|---|---|---|
| CN | 112270734 | A | | 1/2021 | |
| CN | 112933597 | B | * | 10/2022 | G06T 1/20 |
| CN | 115690267 | A | | 2/2023 | |
| WO | WO 2022226724 | A1 | | 11/2022 | |
| WO | WO-2023041838 | A1 | * | 3/2023 | G06T 9/001 |

OTHER PUBLICATIONS

Tencent Technology, ISR, PCT/CN2023/123919, Dec. 22, 2023, 2 pgs.

* cited by examiner

VIDEO PROCESSING METHOD AND APPARATUS, DEVICE, STORAGE MEDIUM, AND PRODUCT

CROSS-REFERENCE TO RELATED APPLICATIONS

This application is a continuation application of PCT Patent Application No. PCT/CN2023/123919, entitled "VIDEO PROCESSING METHOD AND APPARATUS, DEVICE, STORAGE MEDIUM, AND PRODUCT" filed on Oct. 11, 2023, which claims priority to Chinese Patent Application No. 202211700910.1, entitled "VIDEO PROCESSING METHOD AND APPARATUS, DEVICE, STORAGE MEDIUM, AND PRODUCT" filed with the China National Intellectual Property Administration on Dec. 29, 2022, both of which are incorporated herein by reference in their entirety.

FIELD OF THE TECHNOLOGY

This application relates to the field of computer technologies, and in particular, to a video processing method and apparatus, a device, a storage medium, and a product.

BACKGROUND OF THE DISCLOSURE

With the advancement of scientific and technological research, various video application fields (for example, games, animation, and social software) have gradually increased requirements for video effects (for example, clarity and fluency). An example in which a video is a vertex animation video is used. To improve the effect of the video, more vertices are often needed to record relevant information of each video frame. As a number of vertices increases, memory overheads required for the vertex animation video also increase.

According to research findings, conversion of the vertex animation video into a bone animation video may effectively reduce the memory overheads required for the video. A core of converting the vertex animation video into the bone animation video is a bone weight matrix. In a practical application, a template matching method is usually used to determine the bone weight matrix. Due to a difference existing between an object in a different video and a template, the bone weight matrix determined by using the template matching method has relatively low fitting accuracy.

SUMMARY

Embodiments of this application provide a video processing method and apparatus, a device, a computer-readable storage medium, and a product, so as to improve fitting accuracy of a bone weight matrix.

According to an aspect, an embodiment of this application provides a video processing method performed by a computer device, the method including:

obtaining a bone rotation and translation matrix of an object in a first video frame of a target video, the object including M vertices and N bones, N and M being both positive integers;

predicting positions of the M vertices in a second video frame of the target video subsequent to the first video frame by using a bone weight matrix of the object and the bone rotation and translation matrix, to obtain predicted positions of the M vertices; alternatively updating the bone weight matrix and the bone rotation and translation matrix based on a difference between real positions of the M vertices in the second video frame and the predicted positions of the M vertices, to obtain a target bone weight matrix; and restoring the target video based on the target bone weight matrix and the bone rotation and translation matrix of the object in the target video.

Correspondingly, this application provides a computer device, the computer device including:

a memory, having a computer program stored therein; and a processor, when executed by the processor, causing the computer device to implement the foregoing video processing method.

Correspondingly, this application provides a non-transitory computer-readable storage medium. The computer-readable storage medium has a computer program stored therein, the computer program, when executed by a processor of a computer device, causing the computer device to implement the foregoing video processing method.

In this embodiment of this application, the bone rotation and translation matrix of the object in the first video frame of the target video is obtained, the object includes M vertices and N bones, the bone weight matrix of the object is obtained, and the positions of the M vertices in the second video frame of the target video are predicted by using the bone weight matrix and the bone rotation and translation matrix, to obtain the predicted positions of the M vertices. Alternating iterative updating is performed on bone weight matrix and the bone rotation and translation matrix based on the difference between each of real positions of the M vertices in the second video frame and each of the predicted positions of the M vertices, to obtain the target bone weight matrix. The alternating iterative updating is performed on the bone weight matrix and the bone rotation and translation matrix through the difference between the predicted position of the vertex and the real position of the vertex, so that an error between the predicted position of the vertex and the real position of the vertex may be reduced, thereby improving fitting accuracy of the bone weight matrix.

BRIEF DESCRIPTION OF THE DRAWINGS

To describe the technical solutions in embodiments of this application or in the related art more clearly, the accompanying drawings required for describing the embodiments or the related art are briefly described below. Apparently, the accompanying drawings in the following description show some embodiments of this application, and a person of ordinary skill in the art may still derive other accompanying drawings from these accompanying drawings without creative efforts.

DESCRIPTION OF EMBODIMENTS

Technical solutions in embodiments of this application are clearly and completely described below with reference to accompanying drawings in the embodiments of this application. Apparently, the described embodiments are merely some rather than all of the embodiments of this application. All other embodiments obtained by a person of ordinary skill in the art based on the embodiments of this application without creative efforts fall within the protection scope of this application.

Figure 1A:
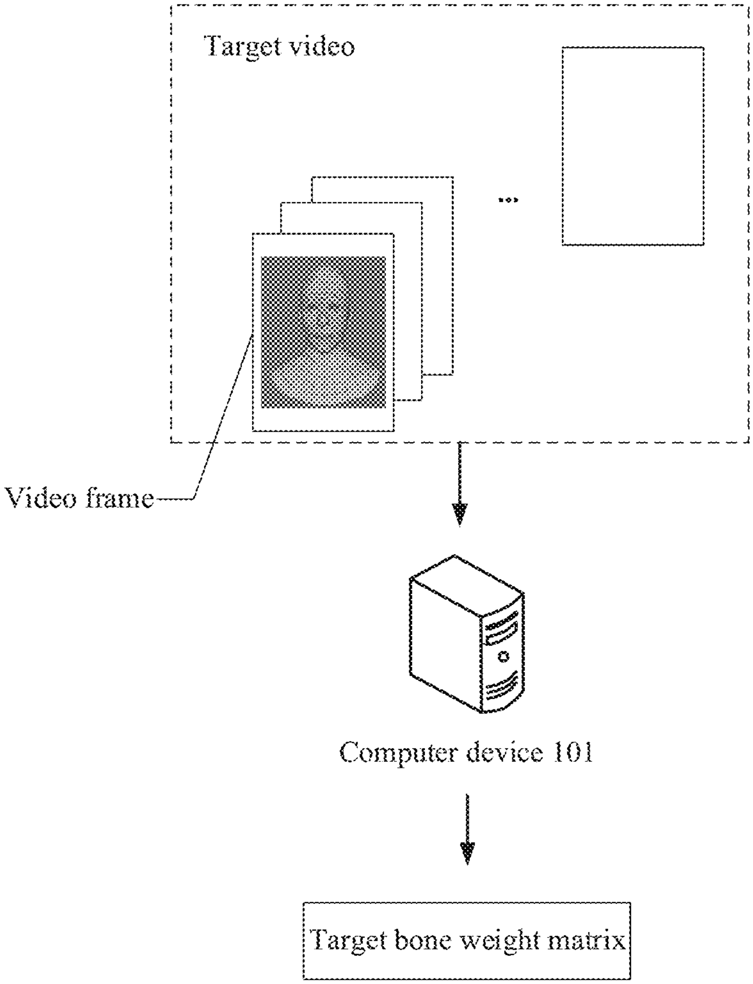
FIG. 1A is a scene architecture diagram of a video processing system according to an embodiment of this application.

The embodiments of this application provide a video processing solution, to improve fitting accuracy of a bone weight matrix. FIG. 1A is a scene architecture diagram of a video processing system according to an embodiment of this application. As shown in FIG. 1A, the video processing system may include a computer device 101. The video processing solution provided in the embodiments of this application may be executed by the computer device 101. The computer device 101 may specifically be a terminal device or a server. The terminal device may include, but is not limited to a smartphone (for example, an Android phone or an IOS phone), a tablet computer, a portable personal computer, a mobile Internet device (MID), an on-board terminal, a smart home appliance, an aircraft, a wearable device, or the like, which is not limited in the embodiments of this application. The server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform, which is not limited in the embodiments of this application.

A general process of the video processing solution is as follows.

(1) The computer device 101 obtains a bone rotation and translation matrix of an object in a first video frame of a target video, the object including M vertices and N bones, N and M being both positive integers. The object may specifically refer to any creature (for example, a person or a pet) having bones, a limb part (for example, a head, a hand, or a foot) of the creature, a biological model (for example, a 3D human body model), a limb model, or the like. In some embodiments, the object may further be a robot driven by joints. When the object is the robot, the joints of the robot may be used as bones of the robot. The first video frame may specifically be any video frame in the target video other than a video frame that is played last. The bone rotation and translation matrix in the first video frame is configured for indicating amounts of rotation and translation of the N bones in the first video frame from positions in the first video frame to positions in a second video frame. The second video frame is a video frame after the first video frame when the target video is played.

Figure 1B:
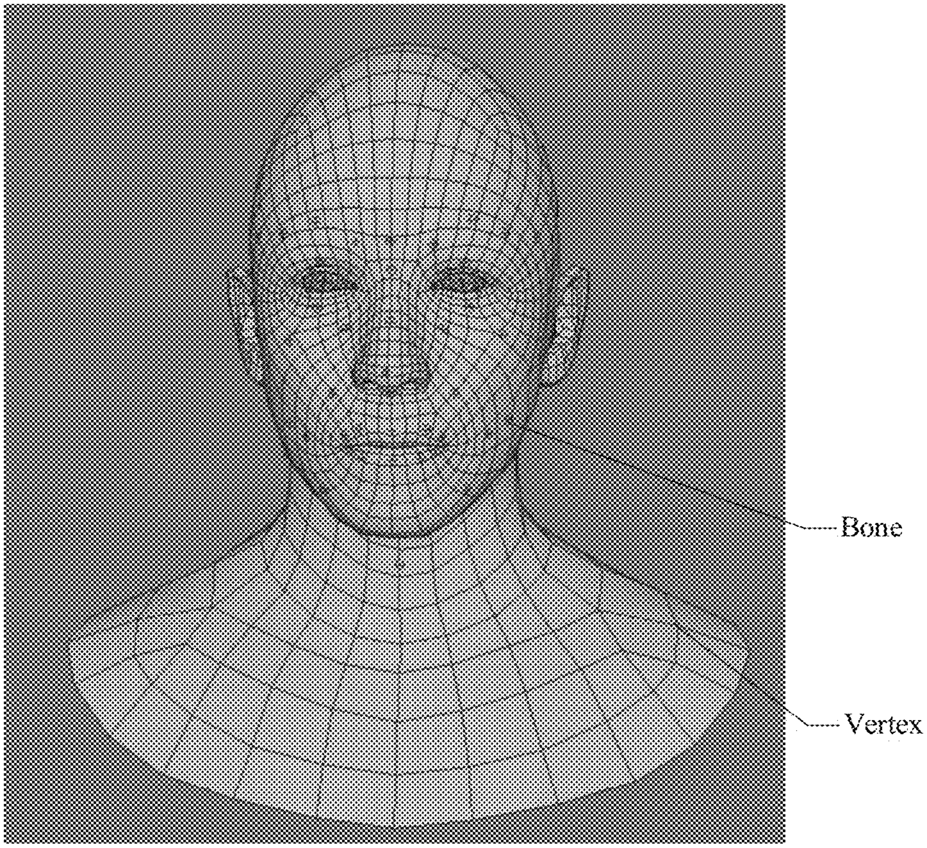
FIG. 1B is a schematic structural diagram of a head model according to this application.

In an implementation, the computer device 101 first obtains the target video and a mesh structure and a bone position of the object in the target video. FIG. 1B is a schematic structural diagram of a head model according to this application. As shown in FIG. 1B, an object (the head model) includes a plurality of bones and a plurality of vertices. A junction of mesh lines is a vertex of the object (the head model). A computer device 101 may capture vertex animation data of each video frame through a vertex capture system. The vertex animation data of each video frame includes a position of each vertex in the video frame. An amount of rotation and translation of each vertex moving from a position in one video frame to a position in another video frame may be calculated through vertex animation data of two video frames. Further, the computer device 101 respectively calculates a distance (for example, a Euclidean distance) between each bone and each vertex, and determines a vertex closest to each bone as a vertex corresponding to the bone. After a correspondence between the bone and the vertex is determined, the computer device 101 may determine the amount of rotation and translation of the vertex corresponding to each bone as the amount of rotation and translation of the bone, and obtain a bone rotation and translation matrix of the object in a first video frame of a target video based on the amount of rotation and translation of each bone.

(2) The computer device 101 obtains a bone weight matrix of the object. The bone weight matrix is configured to generate a bone animation. The bone weight matrix of the object may be a preset matrix, or may be a randomly generated matrix, and may further be a matrix obtained by using a template matching method. In some embodiments, the bone weight matrix of the object is the bone weight matrix obtained through processing an initial bone weight matrix by using the video processing method provided in this application. A representation of a parameter such as the bone weight or the amount of rotation and translation is not limited in this application. In a practical application, the parameter such as the weight of each bone or the amount of rotation and translation of each bone may be represented not only through a matrix but also through another representation. For example, the parameter is represented as a bone weight sequence or a bone rotation and translation sequence. For another example, N bone weights corresponding to each vertex are respectively represented through a vector.

(3) The computer device 101 predicts positions of M vertices in a second video frame of the target video by using the bone weight matrix and the bone rotation and translation matrix, to obtain predicted positions of the M vertices. A vertex i is any vertex among the M vertices. In an implementation, the computer device 101 obtains a position of the vertex i in the first video frame in a local space of N bones. The position of the vertex i in the local space of a bone j may be obtained based on conversion of the position of the vertex i in the first video frame and the position of the bone j in the first video frame, the bone j being any one of the N bones. The computer device 101 calculates a position of a vertex i in the second video frame of the target video in the local space of the N bones through the bone rotation and translation matrix and the position of the vertex i in the first video frame in the local space of the N bones; and calculates the position of the vertex i in the second video frame based on the position of the vertex i in the second video frame in the local space of the N bones and the bone weight matrix, to obtain a predicted position of the vertex i. In another implementation, the computer device 101 may directly obtain the position of the vertex i in the second video frame of the target video in the local space of the N bones; and calculate the position of the vertex i in the second video frame based on the position of the vertex i in the second video frame in the local space of the N bones and the bone weight matrix, to obtain a predicted position of the vertex i.

(4) The computer device 101 performs alternating iterative updating on the bone weight matrix and the bone rotation and translation matrix based on the difference between each of real positions of the M vertices in the second video frame and each of the predicted positions of the M vertices, to obtain a target bone weight matrix. The alternating iterative updating means that one of the bone weight matrix and the bone rotation and translation matrix is kept unchanged each time the iterative updating is performed, the iterative updating is performed on the other matrix based on the difference between each of the real positions of the M vertices in the second video frame and each of the predicted positions of the M vertices, and the predicted positions of the M vertices are predicted again based on the updated matrix and the other un-updated matrix upon completion of a round of iterative updating on each matrix. A number of iterations for each round of iterative updating may be dynamically adjusted based on an actual requirement, which is not limited in this application.

In an implementation, the predicted positions include first positions. The computer device 101 updates the bone weight matrix based on a difference between each of the real positions of the M vertices in the second video frame and each of the first positions of the M vertices, to obtain an updated bone weight matrix, and predicts the positions of the M vertices in the second video frame through the updated bone weight matrix and the bone rotation and translation matrix, to obtain second positions of the M vertices. After the second positions of the M vertices are obtained, the computer device 101 updates the bone rotation and translation matrix based on a difference between each of the real positions of the M vertices in the second video frame and each of the second positions of the M vertices, to obtain the updated bone rotation and translation matrix, then predicts the positions of the M vertices in the second video frame through the updated bone weight matrix and the updated bone rotation and translation matrix, to obtain third positions of the M vertices, and updates the updated bone weight matrix again based on a difference between each of the real positions of the M vertices in the second video frame and each of the third positions of the M vertices, to obtain the target bone weight matrix.

Further, the computer device 101 may obtain the bone rotation and translation matrix of the object in each video frame of the target video, and restore the target video through the target bone weight matrix and the bone rotation and translation matrix of the object in each video frame of the target video.

In this embodiment of this application, the bone rotation and translation matrix of the object in the first video frame of the target video is obtained, the object includes M vertices and N bones, the bone weight matrix of the object is obtained, and the positions of the M vertices in the second video frame of the target video are predicted by using the bone weight matrix and the bone rotation and translation matrix, to obtain the predicted positions of the M vertices. The alternating iterative updating is performed on the bone weight matrix and the bone rotation and translation matrix based on the difference between each of real positions of the M vertices in the second video frame and each of the predicted positions of the M vertices, to obtain the target bone weight matrix. The alternating iterative updating is performed on the bone weight matrix and the bone rotation and translation matrix through the difference between the predicted position of the vertex and the real position of the vertex, so as to reduce an error between the predicted position of the vertex and the real position of the vertex, thereby improving fitting accuracy of the bone weight matrix, so that the fitting accuracy of the target video restored through the target bone weight matrix is higher.

Based on the foregoing video processing solution, an embodiment of this application provides a more detailed video processing method. The video processing method provided in this embodiment of this application is described in detail below with reference to the accompanying drawings.

Figure 2:
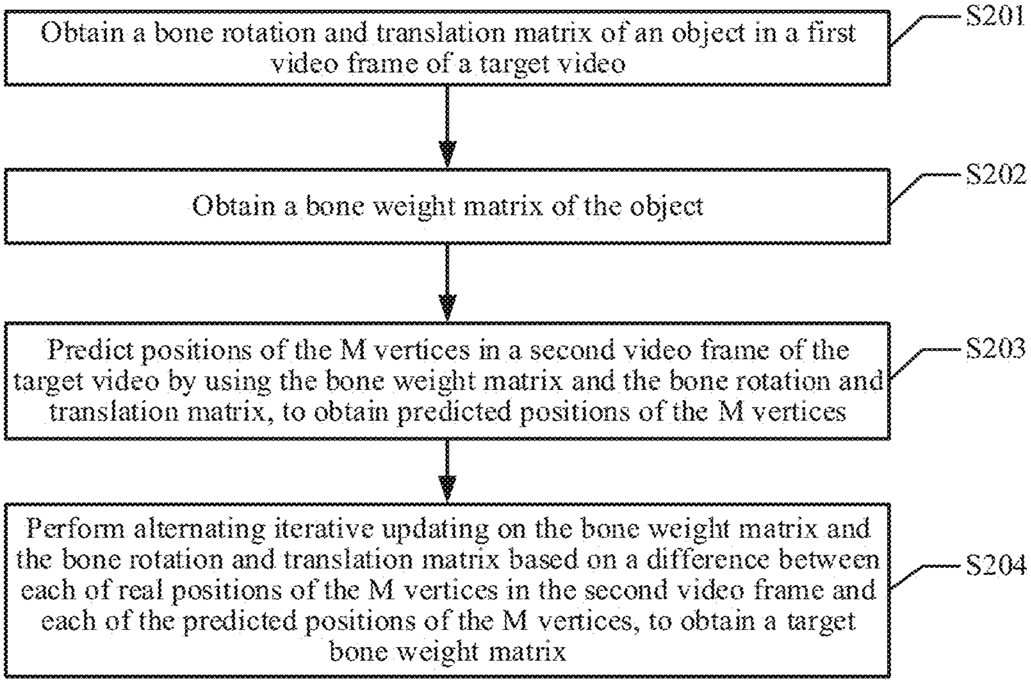
FIG. 2 is a flowchart of a video processing method according to an embodiment of this application.

FIG. 2 is a flowchart of a video processing method according to an embodiment of this application. The video processing method may be performed by a computer device. The computer device may be a terminal device or a server. As shown in FIG. 2, the video processing method may include the following operations S201-S204.

S201: Obtain a bone rotation and translation matrix of an object in a first video frame of a target video.

The object includes M vertices and N bones, N and M being both positive integers. The object may specifically refer to any creature (for example, a person or a pet) having bones, a limb part (for example, a head, a hand, or a foot) of the creature, a biological model (for example, a 3D human body model), a limb model, or the like. In some embodiments, the object may further be a robot driven by joints. When the object is the robot, the joints of the robot may be used as bones of the robot. The first video frame may specifically be any video frame in the target video other than a video frame that is played last. The bone rotation and translation matrix in the first video frame is configured for indicating amounts of rotation and translation of the N bones in the first video frame from positions in the first video frame to positions in a second video frame. The second video frame is a video frame after the first video frame when the target video is played.

In some embodiments, the target video may be a target animation, and the first video frame may be a first animation frame of the target animation, which is not limited in this application.

In an implementation, the computer device first obtains the target video and a model of the object in the target video. The model of the object includes a mesh structure and a bone position. The model of the object may be of any precision (for the same model, a higher precision indicates larger numbers of vertices and bones included in the model). In other words, the video processing method provided in this application may adapt to a model of any precision, and can improve efficiency of converting a vertex animation to a bone animation. Further, the computer device may capture vertex animation data of each video frame through a vertex capture system. The vertex animation data of each video frame includes a position (for example, a real position) of each vertex in the video frame. An amount of rotation and translation of each vertex moving from a position in one video frame to a position in another video frame may be calculated through vertex animation data of two video frames. Still further, the computer device respectively calculates a distance (for example, a Euclidean distance) between each bone and each vertex, and determines a vertex closest to each bone as a vertex corresponding to the bone.

In an embodiment, after a correspondence between the bone and the vertex is determined, the computer device may determine the amount of rotation and translation of the vertex corresponding to each bone as the amount of rotation and translation of the bone, and obtain a bone rotation and translation matrix of the object in a first video frame of a target video based on the amount of rotation and translation of each bone. For example, assuming that a bone j corresponds to a vertex k, the computer device may determine an amount of rotation and translation of the vertex k in the first video frame through a real position of the vertex k in the first video frame and a real position of the vertex k in the second video frame, use the amount of rotation and translation of the vertex k in the first video frame as an amount of rotation and translation of the bone j in the first video frame, and construct the bone rotation and translation matrix of the object in the first video frame based on the amount of rotation and translation of each of the N bones in the first video frame after obtaining the amount of rotation and translation of each of the N bones in the first video frame.

In another embodiment, the computer device may establish a mapping relationship between the bone and the vertex corresponding to the bone based on the position of each bone in the first video frame and the position of the vertex corresponding to the bone in the first video frame, and determine the amount of rotation and translation of the bone in the first video frame based on the mapping relationship and the amount of rotation and translation of the vertex corresponding to the bone. For example, assuming that the bone j corresponds to the vertex k, the computer device establishes a mapping relationship between the bone j and the vertex k based on positions of the bone j and the vertex k in the first video frame; and determine the amount of rotation and translation of the vertex k in the first video frame through the real position of the vertex k in the first video frame and the real position of the vertex k in the second video frame. Next, the amount of rotation and translation of the bone j in the first video frame are calculated based on the mapping relationship between the bone j and the vertex k and the amount of rotation and translation of the vertex k in the first video frame. The bone rotation and translation matrix of the object in the first video frame is constructed based on the amount of rotation and translation of each of the N bones in the first video frame after the amount of rotation and translation of each of the N bones in the first video frame are obtained.

In some embodiments, the amount of rotation and translation may also be referred to as an amount of bone rotation and translation, which is not limited in this application.

S202: Obtain a bone weight matrix of the object.

The bone weight matrix is configured to generate a bone animation. A bone weight of a vertex i in the bone j is configured for indicating a degree of influence of the bone j on a position of the vertex i during movement of the object. A larger bone weight value of the vertex i in the bone j indicates a higher degree of influence of the bone j on the position of the vertex i during the movement of the object. The vertex i is any one of M vertices, and the bone j is any one of N bones. Specifically, the computer device may generate the bone animation corresponding to the target video through the bone weight matrix and the bone rotation and translation matrix of the object in each video frame of the target video. The bone weight matrix of the bone object may be a preset matrix, or may be a randomly generated matrix, and may further be a matrix obtained by using a template matching method. In some embodiments, the bone weight matrix of the object is the bone weight matrix obtained through processing an initial bone weight matrix by using the video processing method provided in this application.

S203: Predict positions of the M vertices in a second video frame of the target video by using the bone weight matrix and the bone rotation and translation matrix, to obtain predicted positions of the M vertices.

In some embodiments, when the target video is the target animation, and the first video frame is the first animation frame of the target animation, the second video frame may be a second animation frame of the target animation. The second animation frame comes after the first animation frame when the target animation is played.

An equation for the computer device to predict a position of a vertex (any of the M vertices) by using the bone weight matrix and the bone rotation and translation matrix may be expressed as:

$$A' = A_0 w_0 + A_1 w_2 + \ldots + A_n w_n$$

where A' is a position of a predicted vertex in the second video frame of the target video, $A_j$ represents a position of the vertex in the first video frame in the local space of the bone j on which rotation and translation are performed through the bone rotation and translation matrix in the first video frame and that is converted to a vertex in the world coordinate system, and w; represents a bone weight value of the vertex in the bone j. It may be learned from the foregoing equation that a larger bone weight indicates greater influence of the bone on the predicted position of the vertex. A bone weight matrix W may be formed by combining the bone weights of all of the vertices. A dimension of the bone weight matrix W is (N, M), N being a number of vertices of the object, and M being a bone number of the object.

In an implementation, the computer device obtains a position of the vertex i in the first video frame in a local space of N bones. The position of the vertex i in the local space of a bone j may be obtained based on conversion of the position of the vertex i in the first video frame and the position of the bone j in the first video frame, the bone j being any one of the N bones. The computer device calculates a position of the vertex i in the second video frame of the target video in the local space of the N bones through the bone rotation and translation matrix and the position of the vertex i in the first video frame in the local space of the N bones; and calculates the position of the vertex i in the second video frame based on the position of the vertex i in the second video frame in the local space of the N bones and the bone weight matrix, to obtain a predicted position of the vertex i.

In another implementation, the computer device may directly obtain the position of the vertex i in the second video frame of the target video in the local space of the N bones; and calculate the position of the vertex i in the second video frame based on the position of the vertex i in the second video frame in the local space of the N bones and the bone weight matrix, to obtain a predicted position of the vertex i.

S204: Perform alternating iterative updating on the bone weight matrix and the bone rotation and translation matrix based on a difference between each of real positions of the M vertices in the second video frame and each of the predicted positions of the M vertices, to obtain a target bone weight matrix.

The alternating iterative updating may mean that the computer device keeps one of the bone weight matrix and the bone rotation and translation matrix unchanged each time the iterative updating is performed, performs the iterative updating on the other matrix based on the difference between each of the real positions of the M vertices in the second video frame and each of the predicted positions of the M vertices, and predicts the predicted positions of the M vertices again based on the updated matrix and the other un-updated matrix upon completion of a round of iterative updating on each matrix. A number of iterations for each round of iterative updating may be dynamically adjusted based on an actual requirement, which is not limited in this application.

In an implementation, the predicted positions include first positions. The computer device updates the bone weight matrix based on a difference between each of the real positions of the M vertices in the second video frame and each of the first positions of the M vertices, to obtain an updated bone weight matrix. The bone weight matrix is updated through the difference between each of the real positions of the M vertices in the second video frame and each of the first positions of the M vertices, so that an error between the predicted position of the vertex and the real position of the vertex may be reduced, thereby improving fitting accuracy of the bone weight matrix. After the updated bone weight matrix is obtained, the computer device predicts the positions of the M vertices in the second video frame through the updated bone weight matrix and the bone rotation and translation matrix, to obtain second positions of the M vertices, and updates the bone rotation and translation matrix based on a difference between each of the real positions of the M vertices in the second video frame and each of the second positions of the M vertices, to obtain an updated bone rotation and translation matrix. A probability of an excessive offset of a bone position may be reduced by updating the bone rotation and translation matrix. In addition, the target video restored through the updated bone rotation and translation matrix has higher fitting accuracy of the target video than the target video restored through the bone rotation and translation matrix that is not updated. After the updated bone weight matrix and the updated bone rotation and translation matrix are obtained, the computer device predicts the positions of the M vertices in the second video frame through the updated bone weight matrix and the updated bone rotation and translation matrix, to obtain third positions of the M vertices, and updates the updated bone weight matrix again based on a difference between each of the real positions of the M vertices in the second video frame and each of the third positions of the M vertices, to obtain the target bone weight matrix. The error between the predicted position of the vertex and the real position of the vertex may be further reduced by updating updated bone weight matrix again, thereby improving the fitting accuracy of the target video restored through the target bone weight matrix. An example in which the object is a head model is used. Fitting accuracy of a key position of an object (for example, an eye, a nose, or a mouth) in the restored target video may be improved by updating the updated bone weight matrix again.

Further, the computer device may obtain the bone rotation and translation matrix of the object in each video frame of the target video, and restore the target video through the target bone weight matrix and the bone rotation and translation matrix of the object in each video frame of the target video.

In this embodiment of this application, the bone rotation and translation matrix of the object in the first video frame of the target video is obtained, the object includes M vertices and N bones, the bone weight matrix of the object is obtained, and the positions of the M vertices in the second video frame of the target video are predicted by using the bone weight matrix and the bone rotation and translation matrix, to obtain the predicted positions of the M vertices. The alternating iterative updating is performed on the bone weight matrix and the bone rotation and translation matrix based on the difference between each of real positions of the M vertices in the second video frame and each of the predicted positions of the M vertices, to obtain the target bone weight matrix. The alternating iterative updating is performed on the bone weight matrix and the bone rotation and translation matrix through the difference between the predicted position of the vertex and the real position of the vertex, so as to reduce the error between the predicted position of the vertex and the real position of the vertex, thereby improving fitting accuracy of the bone weight matrix, so that the fitting accuracy of the target video restored through the target bone weight matrix is higher.

Figure 3:
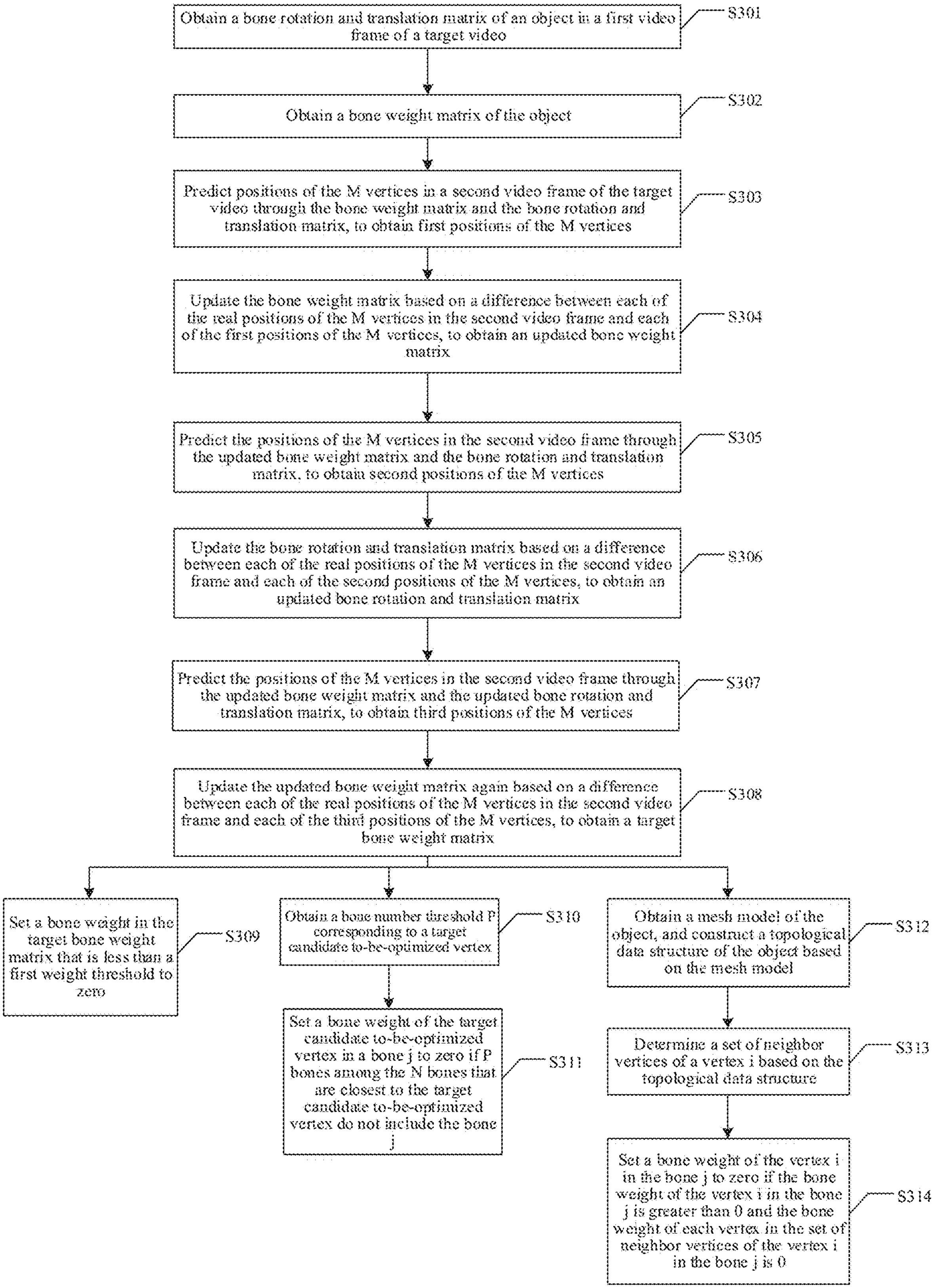
FIG. 3 is a flowchart of another video processing method according to an embodiment of this application.

FIG. 3 is a flowchart of another video processing method according to an embodiment of this application. The video processing method may be performed by a computer device. The computer device may be a terminal device or a server. As shown in FIG. 3, the video processing method may include the following operations S301-S314.

S301: Obtain a bone rotation and translation matrix of an object in a first video frame of a target video.

S302: Obtain a bone weight matrix of the object.

S303: Predict positions of the M vertices in a second video frame of the target video through the bone weight matrix and the bone rotation and translation matrix, to obtain first positions of the M vertices.

For specific implementations of operation S301 to operation S303, reference may be made to implementations of operation S201 to operation S203 in FIG. 2. Details are not described herein again.

S304: Update the bone weight matrix based on a difference between each of the real positions of the M vertices in the second video frame and each of the first positions of the M vertices, to obtain an updated bone weight matrix.

In an implementation, the computer device performs, based on the difference between each of the real positions of the M vertices in the second video frame and each of the first positions of the M vertices, linear regression on the bone weight matrix based on a constraint condition, to obtain the updated bone weight matrix. The constraint condition includes at least one of the following. A weight value corresponding to each bone in the bone weight matrix is greater than or equal to 0, and an abnormal value in the bone weight matrix (for example, the bone weight less than 0) may be filtered through the constraint condition. A sum of the bone weight values of the N bones corresponding to each vertex is 1. The sum of the bone weight values of the N bones corresponding to each vertex is normalized, so that the bone weight values of the M vertices may be unified. A number of bones corresponding to the vertices whose bone weight is greater than a preset value is less than K, K being a positive integer. The number of bones that have influence on each vertex is limited, so that noisy data may be filtered (for example, when the number of bones whose bone weight value corresponding to a vertex i is greater than the preset value is greater than K, the bone weight less than a preset bone weight value (for example, 0.01) is set to zero), thereby reducing algorithm complexity. Exemplarily, that the bone weight of the vertex i in the bone weight matrix is updated may be expressed as:

$$W_i^T = \text{argmin}\|Aw - b\|$$

$$\text{Subject to: } w \geq 0,\ \|x\|_1 = 1,\ \|x\|_0 \leq K$$

where W is the bone weight matrix, $W_i$ is a bone weight of the vertex i in the bone weight matrix, A is a vertex position of the vertex i in the local space of the N bones in the second video frame, and A is obtained based on the bone rotation and translation matrix in the first video frame. Specifically, the position of the vertex i in the second video frame in the local space of the N bones may be calculated through the bone rotation and translation matrix in the first video frame and the position of the vertex i in the first video frame in the local space of the N bones. During iterative updating of the bone weight matrix, the computer device keeps the bone rotation and translation matrix in the first video frame unchanged. b is a real position of the vertex i in the second video frame. w is a bone weight of the vertex i in the N bones. It may be learned from the equation that the computer device respectively updates the bone weight of each vertex in the bone weight matrix by using a linear regression optimization method based on the constraint condition. The constraint condition includes that the bone weights of the vertex i in the N bones are all greater than or equal to 0 (namely, w≥0). A sum of the bone weights of the vertex i in the N bones is equal to 1 (namely, $\|x\|_1=1$), and a number of bones among the N bones for which the vertex i has a bone weight greater than 0 does not exceed K (namely, $\|x\|_0 \leq K$).

S305: Predict the positions of the M vertices in the second video frame through the updated bone weight matrix and the bone rotation and translation matrix, to obtain second positions of the M vertices.

For a specific implementation of operation S305, reference may be made to an implementation of operation S203 in FIG. 2. Details are not described herein again.

S306: Update the bone rotation and translation matrix based on a difference between each of the real positions of the M vertices in the second video frame and each of the second positions of the M vertices, to obtain an updated bone rotation and translation matrix.

In an implementation, the bone rotation and translation matrix in the first video frame includes the amounts of rotation and translation of the N bones. The computer device constructs an error function based on the difference between each of the real positions of the M vertices in the second video frame and each of the second positions of the M vertices, and respectively updates the amount of rotation and translation of each bone in the bone rotation and translation matrix through the constructed error function, to obtain the updated bone rotation and translation matrix. Exemplarily, the error function constructed based on the difference between each of the real positions of the M vertices in the second video frame and each of the second positions of the M vertices may be expressed as:

$$\min_{R^t, T^t} E^t = \min \sum_{i=1}^{M} \left\| v_i^t - \sum_{j=1}^{N} w_{ij}\left(R_j^t p_i + T_j^t\right) \right\|^2$$

where $$R_j^t$$

is a rotation matrix of the bone j in a $t^{th}$ video frame (pose), and a dimension may be (3, 3);

$$T_j^t$$

is a translation matrix of the bone j in the $t^{th}$ video frame (pose), and the dimension may be (1, 3);

$$v_i^t$$

is a vertex position of the vertex i in a $t^{th}$ video frame (pose), and the dimension may be (1, 3); and $w_{ij}$ is a bone weight value of the vertex i in the bone j, which is obtained based on the updated bone weight matrix. The updated bone weight matrix is kept unchanged during the iterative updating of the bone rotation and translation matrix. $E^t$ is an energy matrix of the $t^{th}$ video frame, M is a total number of vertices, and N is a total number of bones. Based on the foregoing error function, when the computer device performs iterative updating on the bone rotation and translation matrix of the $t^{th}$ video frame, the amounts of rotation and translation of N−1 bones in the $t^{th}$ video frame are kept unchanged each time, and an amount of rotation and translation of another bone in the $t^{th}$ video frame other than N−1 bones is updated. For example, the computer device keeps the amounts of rotation and translation of other N−1 bones in the bone rotation and translation matrix of the $t^{th}$ video frame other than the bone j unchanged when updating the amount of rotation and translation of the bone j in the $t^{th}$ video frame based on the foregoing error function.

According to the implementations of operation S301 to operation S306 described above, the computer device may update the bone rotation and translation matrix corresponding to each video frame of the target video.

S307: Predict the positions of the M vertices in the second video frame through the updated bone weight matrix and the updated bone rotation and translation matrix, to obtain third positions of the M vertices.

For a specific implementation of operation S307, reference may be made to an implementation of operation S203 in FIG. 2. Details are not described herein again.

S308: Update the updated bone weight matrix again based on a difference between each of the real positions of the M vertices in the second video frame and each of the third positions of the M vertices, to obtain the target bone weight matrix.

For a specific implementation of operation S308, reference may be made to an implementation of operation S304. Details are not described herein again.

After the target bone weight matrix is obtained, the computer device may further optimize the target bone weight matrix through at least one of operation S309, operation S310, operation S311, and operation S312 to operation S314.

S309: Set a bone weight in the target bone weight matrix that is less than a first weight threshold to zero.

For example, assuming that the first weight threshold is 0.01, the target bone weight matrix includes a bone weight of a vertex a in a bone b, and the bone weight value is 0.00015 less than 0.01, the computer device sets the bone weight of the vertex a in the bone b to zero (to be specific, a value of the bone weight of the vertex a in the bone b is replaced with 0).

S310: Obtain a bone number threshold P corresponding to a target candidate to-be-optimized vertex.

The target bone weight matrix includes M*N bone weights, a bone weight in row a and column b being a bone weight of a vertex a in a bone b, a being a positive integer less than or equal to M, and b being a positive integer less than or equal to N. A candidate to-be-optimized vertex is a vertex whose bone weight in any one of the N bones is less than a second weight threshold (for example, 0.1) among the M vertices.

If the target bone weight matrix includes at least one candidate to-be-optimized vertex whose bone weight in the bone j is less than the second weight threshold, and the bone j is any one of the N bones, the computer device obtains a bone number threshold corresponding to each candidate to-be-optimized vertex.

In an implementation, the bone number threshold corresponding to each candidate to-be-optimized vertex may be a preset value.

In another implementation, the bone number threshold corresponding to each candidate to-be-optimized vertex is determined based on a first bone number and a second bone number. The target candidate to-be-optimized vertex is used as an example for description below. The target candidate to-be-optimized vertex is any one of the at least one candidate to-be-optimized vertex included in the target bone weight matrix. For the target candidate to-be-optimized vertex, the first bone number is determined based on a bone number bound to the target candidate to-be-optimized vertex and a bone parameter. For example, the first bone number is a difference between the bone number bound to the target candidate to-be-optimized vertex and the bone parameter. For still another example, the first bone number is a sum of the bone number bound to the target candidate to-be-optimized vertex and the bone parameter. For yet another example, the first bone number is the minimum of the bone number bound to the target candidate to-be-optimized vertex and the bone parameter. For yet another example, the first bone number is the maximum of the bone number bound to the target candidate to-be-optimized vertex and the bone parameter. The bone parameter is a preset value (for example, 4). The bone number bound to the target candidate to-be-optimized vertex refers to the number of bones among the N bones for which the target candidate to-be-optimized vertex has a bone weight greater than a third weight threshold (for example, 0). For example, assuming that the third weight threshold is 0, and the target candidate to-be-optimized vertex has 10 bones having the bone weight among the bone weights of the N bones greater than 0, the bone number bound to the target candidate to-be-optimized vertex is 10. The second bone number is calculated based on N. For example, the second bone number is equal to N/100. After the first bone number and the second bone number are obtained, the computer device calculates the bone number threshold P corresponding to the target candidate to-be-optimized vertex based on the first bone number and the second bone number. For example, the bone number threshold P corresponding to the target candidate to-be-optimized vertex is equal to the first bone number plus the second bone number. Exemplarily, the foregoing implementation may be expressed by using an equation as follows:

$$k_{ji} = \min(R_i, \text{min\_bone\_num}) + D_i$$

$$R_i = \sum\nolimits_{l=0}^{m} (\|w_{il} > 0\|)$$

$$D_i = \text{bone\_num}/100$$

where $k_{ji}$ is the bone number threshold P corresponding to the target candidate to-be-optimized vertex, and min ($R_i$, min_bone_num) is the first bone number. In the foregoing equation, the first bone number is the minimum of $R_i$ and min_bone_num, min_bone_num is the bone parameter, $R_i$ is a bone number bound to the vertex i (namely, the target candidate to-be-optimized vertex), $$\sum\nolimits_{l=0}^{m} (\|w_{il} > 0\|)$$

represents that the bone number bound to the vertex i is a sum of numbers of bone weights greater than 0 (the third weight threshold), Di is the second bone number, and bone_num is a total number (i.e., N) of bones of the object. It may be learned from the foregoing equation that more bones included by the object indicate a larger bone number threshold P corresponding to the target candidate to-be-optimized vertex.

S311: Set the bone weight of the target candidate to-be-optimized vertex in the bone j to zero if P bones among the N bones that are closest to the target candidate to-be-optimized vertex do not include the bone j.

For example, it is assumed that P=3, and the N bones are arranged as follows in ascending order of distances to the target candidate to-be-optimized vertex: a bone c, a bone e, a bone a, a bone m, a bone j, and so on. 3 bones closest to the target candidate to-be-optimized vertex in the N bones do not include the bone j, and the computer device sets the bone weight of the target candidate to-be-optimized vertex in the bone j to zero.

S312: Obtain a mesh model of the object, and construct a topological data structure of the object based on the mesh model.

Figure 4:
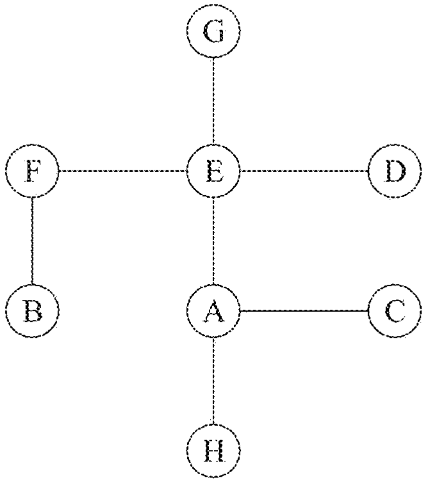
FIG. 4 is a schematic diagram of a vertex and a connecting edge according to an embodiment of this application.

For the mesh model of the object, reference may be made to FIG. 1B. That the computer device constructs the topological data structure of the object based on the mesh model means that the mesh model of the object is converted into a graph topological structure data representation. The topological data structure may be configured for indicating connectivity of the M vertices, and may be configured for indicating a minimum hop count between two vertices that are interconnected. Assuming that the mesh model of the object includes M vertices and N bones, the topological data structure converted based on the mesh model of the object may be expressed as G=(V, ε, S), where V is a vertex in the mesh model of the object, $\varepsilon \subseteq V \times V$ represents an edge of the mesh model of the object, and S is a vertex adjacency matrix formed by integers from 0 to x, which has a size of M*M and represents the connectivity between two vertices in the mesh model of the object. In an implementation, in the vertex adjacency matrix, if a(i, j)=y, it represents that the minimum hop count between the vertex i and the vertex j is y, and if a(i, j)=0, it represents that no connecting edge within x hops exists between the vertex i and the vertex j, x and y being both positive integers, y being less than x. FIG. 4 is a schematic diagram of a vertex and a connecting edge according to an embodiment of this application. As shown in FIG. 4, the minimum hop count of a connecting edge between two vertices is equal to a minimum number of vertices required to pass from one vertex to another plus 1. For example, if the minimum number of vertices required to pass from a vertex A to a vertex E is 0, it represents that the minimum hop count of the connecting edge between the vertex A and the vertex E is equal to 1. In other words, 1-hop connecting edge exists between the vertex A and the vertex E. For another example, if the minimum number of vertices required to pass from the vertex A to a vertex B is 2, it represents that the minimum hop count of the connecting edge between the vertex A and the vertex B is equal to 3.

S313: Determine a set of neighbor vertices of a vertex i based on a topological data structure.

The computer device may determine the set of neighbor vertices of the vertex i based on the vertex adjacency matrix in the topological data structure. The set of neighbor vertices of the vertex i includes vertices among the M vertices having a minimum hop count for the vertex i less than a hop count threshold, the vertex i being any one of the M vertices. For example, it is assumed that the hop count threshold is 2. If a(i, j)=1<2, the computer device adds the vertex j to the set of neighbor vertices of the vertex i.

S314: Set the bone weight of the vertex i in the bone j to zero if the bone weight of the vertex i in the bone j is greater than 0 and the bone weight of each vertex in the set of neighbor vertices of the vertex i in the bone j is 0.

In an implementation, the computer device sets the bone weight of the vertex i in the bone j to zero if the bone weight of the vertex i in the bone j is greater than 0 and the bone weight of each vertex in the set of neighbor vertices of the vertex i in the bone j is 0.

In another implementation, the computer device sets the bone weight of the vertex i in the bone j to zero if the bone weight of the vertex i in the bone j and the bone weight of each vertex in the set of neighbor vertices of the vertex i in the bone j is less than a fourth weight threshold (for example, 0.2), and a target vertex exists in the set of neighbor vertices of the vertex i, the bone weight of the target vertex in the bone j being less than the bone weight of the vertex i in the bone j, and a distance between the target vertex and the bone j being less than a distance between the vertex i and the bone j. For example, assuming that the fourth weight threshold is 0.2, the set of neighbor vertices of the vertex i includes a vertex k, the bone weight of the vertex i in the bone j is 0.15, the Euclidean distance between the vertex i and the bone j is 5, the bone weight of the vertex k in the bone j is 0.11, and the Euclidean distance between the vertex k and the bone j is 3, the computer device sets the bone weight of the vertex i in the bone j to zero.

In some embodiments, the computer device adjusts the bone weight of the vertex i in the bone j if the bone weight of the vertex i in the bone j and the bone weight of each vertex in the set of neighbor vertices of the vertex i in the bone j is less than a fourth weight threshold (for example, 0.2), and a target vertex exists in the set of neighbor vertices of the vertex i, so that an adjusted bone weight of the vertex i in the bone j is less than a bone weight of the target vertex in the bone j.

Figure 5:
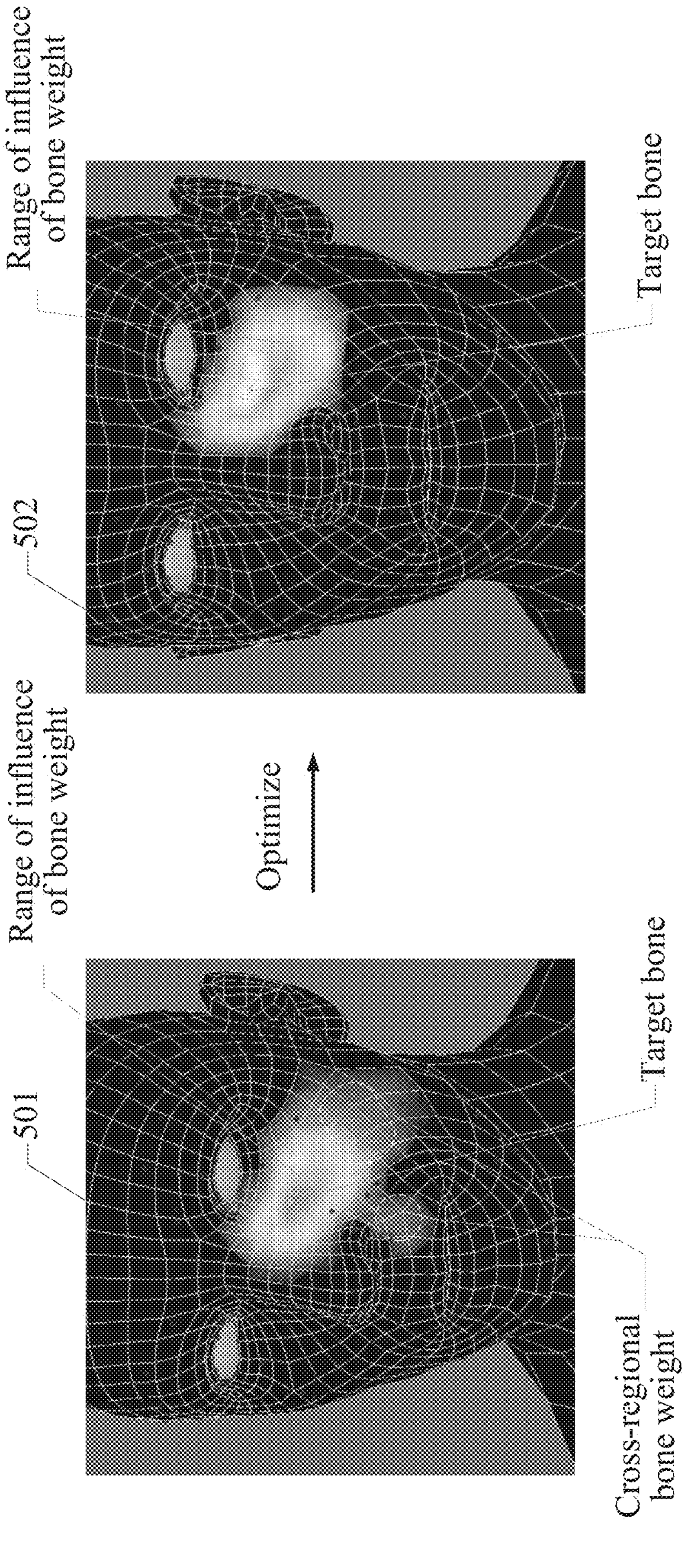
FIG. 5 is a contrast diagram of an optimization effect of a bone weight matrix according to an embodiment of this application.

FIG. 5 is a contrast diagram of an optimization effect of a bone weight matrix according to an embodiment of this application. As shown in FIG. 5, 501 is a diagram of a range of influence of weights of a target bone before optimization, and 502 is a diagram of a range of influence of weights of the target bone after optimization. It may be learned through contrasting 501 and 502 that a cross-region problem of a bone weight may be improved by optimizing a bone weight matrix, thereby effectively constraining the range of influence of the bone weight, and further improving fitting accuracy of a target video restored through an optimized bone weight matrix.

Further, the computer device may obtain a bone rotation and translation matrix of an object in each video frame of the target video, and restore the target video through the optimized target bone weight matrix and the bone rotation and translation matrix of the object in each video frame of the target video. The computer device may also restore the target video through the optimized target bone weight matrix and an updated bone rotation and translation matrix.

In this embodiment of this application, the bone rotation and translation matrix of the object in the first video frame of the target video is obtained, the object includes M vertices and N bones, the bone weight matrix of the object is obtained, and the positions of the M vertices in the second video frame of the target video are predicted by using the bone weight matrix and the bone rotation and translation matrix, to obtain the predicted positions of the M vertices. The alternating iterative updating is performed on the bone weight matrix and the bone rotation and translation matrix based on the difference between each of real positions of the M vertices in the second video frame and each of the predicted positions of the M vertices, to obtain the target bone weight matrix. The alternating iterative updating is performed on the bone weight matrix and the bone rotation and translation matrix through the difference between the predicted position of the vertex and the real position of the vertex, so that an error between the predicted position of the vertex and the real position of the vertex may be reduced, thereby improving fitting accuracy of the bone weight matrix. Further, the cross-region problem of the bone weight may be improved by optimizing the bone weight matrix, thereby effectively constraining the range of influence of the bone weight, and further improving fitting accuracy of the target video restored through the optimized bone weight matrix.

The method of the embodiments of this application is described in detail above. To better implement the foregoing solutions of the embodiments of this application, correspondingly, an apparatus of the embodiments of this application is provided below.

Figure 6:
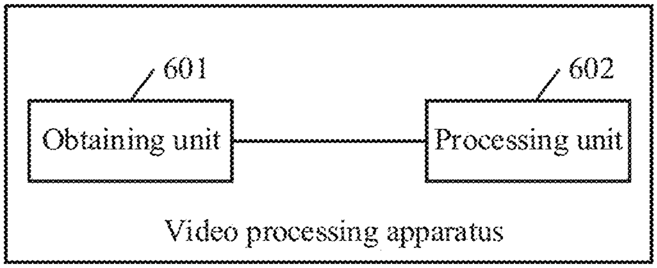
FIG. 6 is a schematic structural diagram of a video processing apparatus according to an embodiment of this application.

FIG. 6 is a schematic structural diagram of a video processing apparatus according to an embodiment of this application. The video processing apparatus shown in FIG. 6 may be installed in a computer device. The computer device may specifically be a terminal device or a server. The video processing apparatus may be configured to perform some or all of the functions in the method embodiments described in FIG. 2 and FIG. 3 above. Referring to FIG. 6, the video processing apparatus includes:

an obtaining unit 601, configured to: obtain a bone rotation and translation matrix of an object in a first video frame of a target video, the object including M vertices and N bones, N and M being both positive integers; and obtain a bone weight matrix of the object; and a processing unit 602, configured to: predict positions of the M vertices in a second video frame of the target video by using the bone weight matrix and the bone rotation and translation matrix, to obtain predicted positions of the M vertices, the second video frame coming after the first video frame when the target video is played; and perform alternating iterative updating on the bone weight matrix and the bone rotation and translation matrix based on a difference between each of real positions of the M vertices in the second video frame and each of the predicted positions of the M vertices, to obtain a target bone weight matrix.

In an implementation, the predicted positions include first positions. The processing unit 602 is configured to perform alternating iterative updating on the bone weight matrix and the bone rotation and translation matrix based on a difference between each of real positions of the M vertices in the second video frame and each of the predicted positions of the M vertices, to obtain a target bone weight matrix, and further configured to:

update the bone weight matrix based on a difference between each of the real positions of the M vertices in the second video frame and each of the first positions of the M vertices, to obtain an updated bone weight matrix;

predict the positions of the M vertices in the second video frame through the updated bone weight matrix and the bone rotation and translation matrix, to obtain second positions of the M vertices;

update the bone rotation and translation matrix based on a difference between each of the real positions of the M vertices in the second video frame and each of the second positions of the M vertices, to obtain an updated bone rotation and translation matrix;

predict the positions of the M vertices in the second video frame through the updated bone weight matrix and the updated bone rotation and translation matrix, to obtain third positions of the M vertices; and update the updated bone weight matrix again based on a difference between each of the real positions of the M vertices in the second video frame and each of the third positions of the M vertices, to obtain the target bone weight matrix.

In an implementation, the processing unit 602 is configured to update the bone weight matrix based on a difference between each of the real positions of the M vertices in the second video frame and each of the first positions of the M vertices, to obtain an updated bone weight matrix, and further configured to:

perform, based on the difference between each of the real positions of the M vertices in the second video frame and each of the first positions of the M vertices, linear regression on the bone weight matrix based on a constraint condition, to obtain the updated bone weight matrix, the constraint condition including at least one of the following: a weight value corresponding to each bone in the bone weight matrix is greater than or equal to 0, a sum of bone weight values of the N bones corresponding to the vertices is 1, and a number of bones corresponding to the vertices whose bone weight is greater than a preset value is less than K, K being a positive integer.

In an implementation, the bone rotation and translation matrix includes an amount of rotation and translation of each of the N bones. The processing unit 602 is configured to: update the bone rotation and translation matrix based on a difference between each of the real positions of the M vertices in the second video frame and each of the second positions of the M vertices, to obtain an updated bone rotation and translation matrix;

construct an error function based on the difference between each of the real positions of the M vertices in the second video frame and each of the second positions of the M vertices; and respectively update the amount of rotation and translation of each bone in the bone rotation and translation matrix through the error function, to obtain the updated bone rotation and translation matrix.

In an implementation, the processing unit 602 is configured to predict positions of the M vertices in a second video frame of the target video by using the bone weight matrix and the bone rotation and translation matrix, to obtain predicted positions of the M vertices, and further configured to:

obtain a position of a vertex i in the first video frame in a local space of the N bones, the vertex i being any vertex among the M vertices;

calculate a position of a vertex i in the second video frame of the target video in the local space of the N bones through the bone rotation and translation matrix and the position of the vertex i in the first video frame in the local space of the N bones; and calculate the position of the vertex i in the second video frame based on the position of the vertex i in the second video frame in the local space of the N bones and the bone weight matrix, to obtain a predicted position of the vertex i.

In an implementation, M is greater than N. The bone rotation and translation matrix of the object in the first video frame of the target video includes the amounts of rotation and translation of the N bones in the first video frame. The processing unit 602 is configured to obtain a bone rotation and translation matrix of an object in a first video frame of a target video, and further configured to:

determine a vertex k corresponding to a bone j based on a distance between the bone j and each of the M vertices, the vertex k being a vertex closest to the bone j among the M vertices, and the bone j being any one of the N bones;

establish a mapping relationship between the bone j and the vertex k based on positions of the bone j and the vertex k in the first video frame; and obtain an amount of rotation and translation of the vertex k in the first video frame, and determine an amount of rotation and translation of the bone j in the first video frame based on the amount of rotation and translation of the vertex k in the first video frame and the mapping relationship between the bone j and the vertex k.

In an implementation, the target bone weight matrix includes M*N bone weights, a bone weight in row a and column b being a bone weight of a vertex a in a bone b, a being a positive integer less than or equal to M, and b being a positive integer less than or equal to N.

In an implementation, the processing unit 602 is further configured to:

set a bone weight in the target bone weight matrix that is less than a first weight threshold to zero.

In an implementation, the target bone weight matrix includes at least one candidate to-be-optimized vertex whose bone weight in the bone j is less than a second weight threshold, the bone j being any one of the N bones. The processing unit 602 is further configured to:

obtain a bone number threshold P corresponding to a target candidate to-be-optimized vertex, the target candidate to-be-optimized vertex being any one of the candidate to-be-optimized vertices whose bone weight in the bone j is less than the second weight threshold, and P being a positive integer less than N; and set a bone weight of the target candidate to-be-optimized vertex in the bone j to zero if P bones among the N bones that are closest to the target candidate to-be-optimized vertex do not include the bone j.

In an implementation, the processing unit 602 is configured to obtain a bone number threshold P corresponding to a target candidate to-be-optimized vertex, and further configured to:

obtain a first bone number and a second bone number corresponding to the target candidate to-be-optimized vertex, the first bone number being determined based on a bone number and a bone parameter bound to the target candidate to-be-optimized vertex, the bone number bound to the target candidate to-be-optimized vertex referring to: a number of bones among the N bones for which the target candidate to-be-optimized vertex has a bone weight greater than a third weight threshold, the second bone number being calculated based on N; and calculate the bone number threshold P corresponding to the target candidate to-be-optimized vertex based on the first bone number and the second bone number.

In an implementation, the processing unit 602 is further configured to:

obtain a mesh model of the object, and construct a topological data structure of the object based on the mesh model, the topological data structure being configured for indicating connectivity of the M vertices and a minimum hop count between connected vertices;

determine a set of neighbor vertices of the vertex i based on the topological data structure, the set of neighbor vertices of the vertex i including vertices among the M vertices having a minimum hop count for the vertex i less than a hop count threshold, and the vertex i being any one of the M vertices; and set the bone weight of the vertex i in the bone j to zero if the bone weight of the vertex i in the bone j is greater than 0 and the bone weight of each vertex in the set of neighbor vertices of the vertex i in the bone j is 0.

In an implementation, the processing unit 602 is further configured to:

set the bone weight of the vertex i in the bone j to zero if the bone weight of the vertex i in the bone j and the bone weight of each vertex in the set of neighbor vertices of the vertex i in the bone j is less than a fourth weight threshold, and a target vertex exists in the set of neighbor vertices of the vertex i, the bone weight of the target vertex in the bone j being less than the bone weight of the vertex i in the bone j, and a distance between the target vertex and the bone j being less than a distance between the vertex i and the bone j.

In an implementation, the target video includes Q video frames, Q being a positive integer. The processing unit 602 is further configured to:

obtain a bone rotation and translation matrix of the object in the Q video frames; and restore the target video based on the target bone weight matrix and the bone rotation and translation matrix of the object in the Q video frames.

According to an embodiment of this application, some operations involved in the video processing method shown in FIG. 2 and FIG. 3 may be performed by the units in the video processing apparatus shown in FIG. 6. For example, operation S201 and operation S202 shown in FIG. 2 may be performed by the obtaining unit 601 shown in FIG. 6, and operation S203 and operation S204 shown in FIG. 2 may be performed by the processing unit 602 shown in FIG. 6. Operation S301, operation S302, operation S310, and operation S312 shown in FIG. 3 may be performed by the obtaining unit 601 shown in FIG. 6. Operation S303 to operation S309, operation S311, operation S313, and operation S314 may be performed by the processing unit 602 shown in FIG. 6. The units in the video processing apparatus shown in FIG. 6 may be separately or all combined into one or several additional units, or one (some) of the units may further be split into a plurality of units with smaller functions, so as to realize the same operation without affecting the implementation of the technical effects of the embodiments of this application. The foregoing units are divided based on logical functions. In a practical application, functions of one unit may also be implemented by a plurality of units, or the functions of the plurality of units may be implemented by one unit. In another embodiment of this application, the video processing apparatus may also include another unit. In an actual application, these functions may also be implemented with assistance of another unit, and may be implemented by a plurality of units in collaboration.

According to another embodiment of this application, a computer program (including program code) that can perform the operations involved in the corresponding methods shown in FIG. 2 and FIG. 3 may be run on a general-purpose computing apparatus such as a computer device including processing elements such as a central processing unit (CPU) and storage elements such as a random access storage medium (RAM) and a read-only storage medium (ROM), to construct the video processing apparatus shown in FIG. 6 and implement the video processing method in the embodiments of this application. The computer program may be recorded in, for example, a computer-readable recording medium, and may be loaded into the computing apparatus through a computer-readable recording medium and run in the computing apparatus.

Based on the same inventive concept, the principles and the beneficial effects of the video processing apparatus provided in the embodiments of this application in solving the problems are similar to the principles and the beneficial effects of the video processing method of the method embodiments of this application in solving the problems. Reference may be made to the principles and the beneficial effects of the implementation of the method. For brevity, details are not described herein again.

Figure 7:
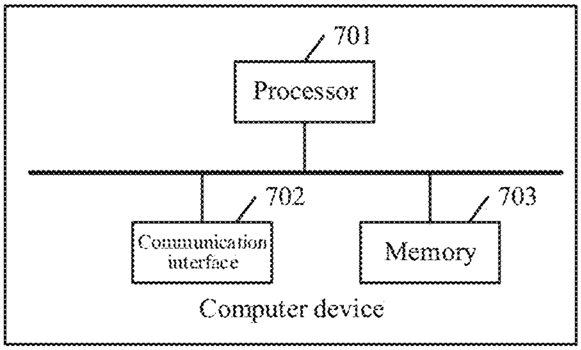
FIG. 7 is a schematic structural diagram of a computer device according to an embodiment of this application.

FIG. 7 is a schematic structural diagram of a computer device according to an embodiment of this application. The computer device may be a terminal device or a server. As shown in FIG. 7, the computer device includes at least a processor 701, a communication interface 702, and a memory 703. The processor 701, the communication interface 702, and the memory 703 may be connected through a bus or in another manner. The processor 701 (or referred to as a CPU) is a computing core and a control core of the computer device, which may parse various instructions in the computer device and process various data of the computer device. For example, the CPU may be configured to parse an on/off instruction transmitted by an object to the computer device, and control the computer device to perform an on/off operation. For another example, the CPU may transfer various types of interactive data between internal structures of the computer device. In some embodiments, the communication interface 702 may include a standard wired interface and a standard wireless interface (for example, a Wi-Fi interface and a mobile communication interface), and may be controlled by the processor 701 to transmit and receive data. The communication interface 702 may further be configured for data transmission and interaction within the computer device. The memory 703 is a memory device in the computer device, which is configured to store a program and data. The memory 703 herein may include a built-in memory of the computer device, and certainly, may also include an extended memory supported by the computer device. The memory 703 provides a storage space. The storage space stores an operating system of the computer device. The operating system may include but is not limited to an Android system, an internetworking operating system (IOS), and the like, which is not limited in this application.

An embodiment of this application further provides a non-transitory computer-readable storage medium (memory). The computer-readable storage medium is a memory device in a computer device, which is configured to store a program and data. The computer-readable storage medium herein may include a built-in storage medium in the computer device, and certainly, may also include an extended storage medium supported by the computer device. The computer-readable storage medium provides a storage space. The storage space stores a processing system of the computer device. In addition, a computer program adapted to be loaded and executed by the processor 701 is further stored in the storage space. The computer-readable storage medium herein may be a high-speed RAM memory, or may be a non-volatile memory, for example, at least one magnetic disk memory. In some embodiments, the computer-readable storage medium may further be at least one computer-readable storage medium away from the foregoing processor.

In an embodiment, the processor 701 performs the following operations by running the computer program in the memory 703:

obtaining a bone rotation and translation matrix of an object in a first video frame of a target video, the object including M vertices and N bones, N and M being both positive integers;

obtaining a bone weight matrix of the object;

predicting positions of the M vertices in a second video frame of the target video by using the bone weight matrix and the bone rotation and translation matrix, to obtain predicted positions of the M vertices, the second video frame coming after the first video frame when the target video is played; and performing alternating iterative updating on the bone weight matrix and the bone rotation and translation matrix based on a difference between each of real positions of the M vertices in the second video frame and each of the predicted positions of the M vertices, to obtain a target bone weight matrix.

In an embodiment, the predicted positions include first positions. The performing, by the processor 701, alternating iterative updating on the bone weight matrix and the bone rotation and translation matrix based on a difference between each of real positions of the M vertices in the second video frame and each of the predicted positions of the M vertices, to obtain a target bone weight matrix includes the following specific embodiments:

updating the bone weight matrix based on a difference between each of the real positions of the M vertices in the second video frame and each of the first positions of the M vertices, to obtain an updated bone weight matrix;

predicting the positions of the M vertices in the second video frame through the updated bone weight matrix and the bone rotation and translation matrix, to obtain second positions of the M vertices;

updating the bone rotation and translation matrix based on a difference between each of the real positions of the M vertices in the second video frame and each of the second positions of the M vertices, to obtain an updated bone rotation and translation matrix;

predicting the positions of the M vertices in the second video frame through the updated bone weight matrix and the updated bone rotation and translation matrix, to obtain third positions of the M vertices; and updating the updated bone weight matrix again based on a difference between each of the real positions of the M vertices in the second video frame and each of the third positions of the M vertices, to obtain the target bone weight matrix.

In an embodiment, the updating, by the processor 701, the bone weight matrix based on a difference between each of the real positions of the M vertices in the second video frame and each of the first positions of the M vertices, to obtain an updated bone weight matrix includes the following specific embodiments:

performing, based on the difference between each of the real positions of the M vertices in the second video frame and each of the first positions of the M vertices, linear regression on the bone weight matrix based on a constraint condition, to obtain the updated bone weight matrix, the constraint condition including at least one of the following: a weight value corresponding to each bone in the bone weight matrix is greater than or equal to 0, a sum of bone weight values of the N bones corresponding to the vertices is 1, and a number of bones corresponding to the vertices whose bone weight is greater than a preset value is less than K, K being a positive integer.

In an embodiment, the bone rotation and translation matrix includes an amount of rotation and translation of each of the N bones. The updating, by the processor 701, the bone rotation and translation matrix based on a difference between each of the real positions of the M vertices in the second video frame and each of the second positions of the M vertices to obtain an updated bone rotation and translation matrix includes the following specific embodiments:

constructing an error function based on the difference between each of the real positions of the M vertices in the second video frame and each of the second positions of the M vertices; and respectively updating the amount of rotation and translation of each bone in the bone rotation and translation matrix through the error function, to obtain the updated bone rotation and translation matrix.

In an embodiment, the predicting, by the processor 701, positions of the M vertices in a second video frame of the target video by using the bone weight matrix and the bone rotation and translation matrix, to obtain predicted positions of the M vertices includes the following specific embodiments:

obtaining a position of a vertex i in the first video frame in a local space of the N bones, the vertex i being any vertex among the M vertices;

calculating a position of a vertex i in the second video frame of the target video in the local space of the N bones through the bone rotation and translation matrix and the position of the vertex i in the first video frame in the local space of the N bones; and calculating the position of the vertex i in the second video frame based on the position of the vertex i in the second video frame in the local space of the N bones and the bone weight matrix, to obtain a predicted position of the vertex i.

In an embodiment, M is greater than N. The bone rotation and translation matrix of the object in the first video frame of the target video includes the amounts of rotation and translation of the N bones in the first video frame. The obtaining, by the processor 701, a bone rotation and translation matrix of an object in a first video frame of a target video includes the following specific embodiments:

determining a vertex k corresponding to a bone j based on a distance between the bone j and each of the M vertices, the vertex k being a vertex closest to the bone j among the M vertices, and the bone j being any one of the N bones;

establishing a mapping relationship between the bone j and the vertex k based on positions of the bone j and the vertex k in the first video frame; and obtaining an amount of rotation and translation of the vertex k in the first video frame, and determining an amount of rotation and translation of the bone j in the first video frame based on the amount of rotation and translation of the vertex k in the first video frame and the mapping relationship between the bone j and the vertex k.

In an embodiment, the target bone weight matrix includes M*N bone weights, a bone weight in row a and column b being a bone weight of a vertex a in a bone b, a being a positive integer less than or equal to M, and b being a positive integer less than or equal to N.

In some embodiments, the processor 701 further performs the following operation by running the computer program in the memory 703:

setting a bone weight in the target bone weight matrix that is less than a first weight threshold to zero.

In an embodiment, the target bone weight matrix includes at least one candidate to-be-optimized vertex whose bone weight in the bone j is less than the second weight threshold, the bone j being any one of the N bones. The processor 701 further performs the following operations by running the computer program in the memory 703:

obtaining a bone number threshold P corresponding to a target candidate to-be-optimized vertex, the target candidate to-be-optimized vertex being any one of the candidate to-be-optimized vertices whose bone weight in the bone j is less than the second weight threshold, and P being a positive integer less than N; and setting a bone weight of the target candidate to-be-optimized vertex in the bone j to zero if P bones among the N bones that are closest to the target candidate to-be-optimized vertex do not include the bone j.

In an embodiment, the obtaining, by the processor 701, a bone number threshold P corresponding to the target candidate to-be-optimized vertex includes the following specific embodiments:

obtaining a first bone number and a second bone number corresponding to the target candidate to-be-optimized vertex, the first bone number being determined based on a bone number and a bone parameter bound to the target candidate to-be-optimized vertex, the bone number bound to the target candidate to-be-optimized vertex referring to: a number of bones among the N bones for which the target candidate to-be-optimized vertex has a bone weight greater than a third weight threshold, the second bone number being calculated based on N; and calculating the bone number threshold P corresponding to the target candidate to-be-optimized vertex based on the first bone number and the second bone number.

In an embodiment, the processor 701 further performs the following operations by running the computer program in the memory 703:

obtaining a mesh model of the object, and construct a topological data structure of the object based on the mesh model, the topological data structure being configured for indicating connectivity of the M vertices and a minimum hop count between connected vertices;

determining a set of neighbor vertices of the vertex i based on the topological data structure, the set of neighbor vertices of the vertex i including vertices among the M vertices having a minimum hop count for the vertex i less than a hop count threshold, and the vertex i being any one of the M vertices; and setting the bone weight of the vertex i in the bone j to zero if the bone weight of the vertex i in the bone j is greater than 0 and the bone weight of each vertex in the set of neighbor vertices of the vertex i in the bone j is 0.

In an embodiment, the processor 701 further performs the following operation by running the computer program in the memory 703:

setting the bone weight of the vertex i in the bone j to zero if the bone weight of the vertex i in the bone j and the bone weight of each vertex in the set of neighbor vertices of the vertex i in the bone j is less than a fourth weight threshold, and a target vertex exists in the set of neighbor vertices of the vertex i, the bone weight of the target vertex in the bone j being less than the bone weight of the vertex i in the bone j, and a distance between the target vertex and the bone j being less than a distance between the vertex i and the bone j.

In an embodiment, the target video includes Q video frames, Q being a positive integer. The processor 701 further performs the following operations by running the computer program in the memory 703:

obtaining a bone rotation and translation matrix of the object in the Q video frames; and restoring the target video based on the target bone weight matrix and the bone rotation and translation matrix of the object in the Q video frames.

Based on the same inventive concept, the principles and the beneficial effects of the computer device provided in the embodiments of this application in solving the problems are similar to the principles and the beneficial effects of the video processing method of the method embodiments of this application in solving the problems. Reference may be made to the principles and the beneficial effects of the implementation of the method. For brevity, details are not described herein again.

An embodiment of this application further provides a non-transitory computer-readable storage medium. The computer-readable storage medium has a computer program stored therein. The computer program is adapted to be loaded and executed by a processor to implement the video processing method in the foregoing method embodiments.

An embodiment of this application further provides a computer program product. The computer program product includes a computer program. The computer program is adapted to be loaded and executed by a processor to implement the video processing method in the foregoing method embodiments.

An embodiment of this application further provides a computer program product or a computer program, the computer program product or the computer program including computer instructions, the computer instructions being stored in a computer-readable storage medium. The processor of the computer device reads the computer instruction from the computer-readable storage medium. The processor executes the computer instruction, causing the computer device to perform the foregoing video processing method.

The operations in the method of the embodiments of this application may be adjusted, merged, and deleted in sequence based on an actual need.

The modules in the apparatus of the embodiments of this application may be merged, divided, and deleted based on an actual need.

A person skilled in the art may understand that all or some of the operations of the various methods in the foregoing embodiments may be completed by instructing related hardware through a program. The program may be stored in a computer-readable storage medium, and the computer-readable storage medium may include: a flash drive, a ROM, a RAM, a magnetic disk, an optical disc, and the like.

In sum, the term "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units. Moreover, each unit can be part of an overall unit that includes the functionalities of the unit. The foregoing content disclosed above is merely preferred embodiments of this application, and certainly is not intended to limit the scope of the claims of this application. A person of ordinary skill in the art may understand all or part of the processes for implementing the foregoing embodiments, and equivalent changes made according to the claims of this application still fall within the scope covered by this application.

What is claimed is:

1. A video processing method performed by a computer device, the method comprising:

obtaining a bone rotation and translation matrix of an object in a first video frame of a target video, the object comprising M vertices and N bones, N and M being both positive integers;

predicting positions of the M vertices in a second video frame of the target video subsequent to the first video frame by using a bone weight matrix of the object and the bone rotation and translation matrix, to obtain predicted positions of the M vertices;

alternatively updating the bone weight matrix and the bone rotation and translation matrix based on a difference between real positions of the M vertices in the second video frame and the predicted positions of the M vertices, to obtain a target bone weight matrix, wherein the target bone weight matrix comprises M*N bone weights, a bone weight in row a and column b being a bone weight of a vertex a in a bone b, a being a positive integer less than or equal to M, and b being a positive integer less than or equal to N; and restoring the target video based on the target bone weight matrix and the bone rotation and translation matrix of the object in the target video.

2. The method according to claim 1, wherein the alternatively updating the bone weight matrix and the bone rotation and translation matrix based on a difference between real positions of the M vertices in the second video frame and the predicted positions of the M vertices, to obtain a target bone weight matrix comprises:

updating the bone weight matrix based on a difference between the real positions of the M vertices in the second video frame and the predicted positions of the M vertices, to obtain an updated bone weight matrix;

predicting the positions of the M vertices in the second video frame through the updated bone weight matrix and the bone rotation and translation matrix, to obtain second positions of the M vertices;

updating the bone rotation and translation matrix based on a difference between the real positions of the M vertices in the second video frame and the second positions of the M vertices, to obtain an updated bone rotation and translation matrix;

predicting the positions of the M vertices in the second video frame through the updated bone weight matrix and the updated bone rotation and translation matrix, to obtain third positions of the M vertices; and further updating the updated bone weight matrix again based on a difference between the real positions of the M vertices in the second video frame and the third positions of the M vertices, to obtain the target bone weight matrix.

3. The method according to claim 1, wherein the predicting positions of the M vertices in a second video frame of the target video by using the bone weight matrix and the bone rotation and translation matrix, to obtain predicted positions of the M vertices comprises:

obtaining a position of a vertex i in the first video frame in a local space of the N bones, the vertex i being any vertex among the M vertices;

calculating a position of a vertex i in the second video frame of the target video in the local space of the N bones through the bone rotation and translation matrix and the position of the vertex i in the first video frame in the local space of the N bones; and calculating the position of the vertex i in the second video frame based on the position of the vertex i in the second video frame in the local space of the N bones and the bone weight matrix, to obtain a predicted position of the vertex i.

4. The method according to claim 1, wherein the bone rotation and translation matrix comprises the amount of rotation and translation of each of the N bones in the first video frame, M being greater than N; and the obtaining a bone rotation and translation matrix of an object in a first video frame of a target video comprises:

determining a vertex k corresponding to a bone j based on a distance between the bone j and each of the M vertices, the vertex k being a vertex closest to the bone j among the M vertices, and the bone j being any one of the N bones;

establishing a mapping relationship between the bone j and the vertex k based on positions of the bone j and the vertex k in the first video frame; and obtaining an amount of rotation and translation of the vertex k in the first video frame, and determining an amount of rotation and translation of the bone j in the first video frame based on the amount of rotation and translation of the vertex k in the first video frame and the mapping relationship.

5. The method according to claim 1, further comprising: setting a bone weight in the target bone weight matrix that is less than a first weight threshold to zero.

6. The method according to claim 1, further comprising:

obtaining a mesh model of the object, and constructing a topological data structure of the object based on the mesh model, the topological data structure being configured for indicating connectivity of the M vertices and a minimum hop count between connected vertices;

determining a set of neighbor vertices of the vertex i based on the topological data structure, the set of neighbor vertices of the vertex i comprising a vertex among the M vertices having a minimum hop count with the vertex i less than a hop count threshold, and the vertex i being any one of the M vertices; and setting the bone weight of the vertex i in the bone j to zero if the bone weight of the vertex i in the bone j is greater than 0 and the bone weight of each vertex in the set of neighbor vertices of the vertex i in the bone j is 0.

7. A computer device, comprising: a memory and a processor, the memory having a computer program stored therein, and the computer program, when executed by the processor, causing the computer device to implement a video processing method including:

obtaining a bone rotation and translation matrix of an object in a first video frame of a target video, the object comprising M vertices and N bones, N and M being both positive integers;

predicting positions of the M vertices in a second video frame of the target video subsequent to the first video frame by using a bone weight matrix of the object and the bone rotation and translation matrix, to obtain predicted positions of the M vertices;

alternatively updating the bone weight matrix and the bone rotation and translation matrix based on a difference between real positions of the M vertices in the second video frame and the predicted positions of the M vertices, to obtain a target bone weight matrix, wherein the target bone weight matrix comprises M*N bone weights, a bone weight in row a and column b being a bone weight of a vertex a in a bone b, a being a positive integer less than or equal to M, and b being a positive integer less than or equal to N; and restoring the target video based on the target bone weight matrix and the bone rotation and translation matrix of the object in the target video.

8. The computer device according to claim 7, wherein the alternatively updating the bone weight matrix and the bone rotation and translation matrix based on a difference between real positions of the M vertices in the second video frame and the predicted positions of the M vertices, to obtain a target bone weight matrix comprises:

updating the bone weight matrix based on a difference between the real positions of the M vertices in the second video frame and the predicted positions of the M vertices, to obtain an updated bone weight matrix;

predicting the positions of the M vertices in the second video frame through the updated bone weight matrix and the bone rotation and translation matrix, to obtain second positions of the M vertices;

updating the bone rotation and translation matrix based on a difference between the real positions of the M vertices in the second video frame and the second positions of the M vertices, to obtain an updated bone rotation and translation matrix;

predicting the positions of the M vertices in the second video frame through the updated bone weight matrix and the updated bone rotation and translation matrix, to obtain third positions of the M vertices; and further updating the updated bone weight matrix again based on a difference between the real positions of the M vertices in the second video frame and the third positions of the M vertices, to obtain the target bone weight matrix.

9. The computer device according to claim 7, wherein the predicting positions of the M vertices in a second video frame of the target video by using the bone weight matrix and the bone rotation and translation matrix, to obtain predicted positions of the M vertices comprises:

obtaining a position of a vertex i in the first video frame in a local space of the N bones, the vertex i being any vertex among the M vertices;

calculating a position of a vertex i in the second video frame of the target video in the local space of the N bones through the bone rotation and translation matrix and the position of the vertex i in the first video frame in the local space of the N bones; and calculating the position of the vertex i in the second video frame based on the position of the vertex i in the second video frame in the local space of the N bones and the bone weight matrix, to obtain a predicted position of the vertex i.

10. The computer device according to claim 7, wherein the bone rotation and translation matrix comprises the amount of rotation and translation of each of the N bones in the first video frame, M being greater than N; and the obtaining a bone rotation and translation matrix of an object in a first video frame of a target video comprises:

determining a vertex k corresponding to a bone j based on a distance between the bone j and each of the M vertices, the vertex k being a vertex closest to the bone j among the M vertices, and the bone j being any one of the N bones;

establishing a mapping relationship between the bone j and the vertex k based on positions of the bone j and the vertex k in the first video frame; and obtaining an amount of rotation and translation of the vertex k in the first video frame, and determining an amount of rotation and translation of the bone j in the first video frame based on the amount of rotation and translation of the vertex k in the first video frame and the mapping relationship.

11. The computer device according to claim 7, wherein the method further comprises:

setting a bone weight in the target bone weight matrix that is less than a first weight threshold to zero.

12. The computer device according to claim 7, wherein the method further comprises:

obtaining a mesh model of the object, and constructing a topological data structure of the object based on the mesh model, the topological data structure being configured for indicating connectivity of the M vertices and a minimum hop count between connected vertices;

determining a set of neighbor vertices of the vertex i based on the topological data structure, the set of neighbor vertices of the vertex i comprising a vertex among the M vertices having a minimum hop count with the vertex i less than a hop count threshold, and the vertex i being any one of the M vertices; and setting the bone weight of the vertex i in the bone j to zero if the bone weight of the vertex i in the bone j is greater than 0 and the bone weight of each vertex in the set of neighbor vertices of the vertex i in the bone j is 0.

13. A non-transitory computer-readable storage medium, having a computer program stored therein, the computer program, when executed by a processor of a computer device, causing the computer device to implement a video processing method including:

obtaining a bone rotation and translation matrix of an object in a first video frame of a target video, the object comprising M vertices and N bones, N and M being both positive integers;

predicting positions of the M vertices in a second video frame of the target video subsequent to the first video frame by using a bone weight matrix of the object and the bone rotation and translation matrix, to obtain predicted positions of the M vertices;

alternatively updating the bone weight matrix and the bone rotation and translation matrix based on a difference between real positions of the M vertices in the second video frame and the predicted positions of the M vertices, to obtain a target bone weight matrix, wherein the target bone weight matrix comprises M*N bone weights, a bone weight in row a and column b being a bone weight of a vertex a in a bone b, a being a positive integer less than or equal to M, and b being a positive integer less than or equal to N; and restoring the target video based on the target bone weight matrix and the bone rotation and translation matrix of the object in the target video.

14. The non-transitory computer-readable storage medium according to claim 13, wherein the alternatively updating the bone weight matrix and the bone rotation and translation matrix based on a difference between real positions of the M vertices in the second video frame and the predicted positions of the M vertices, to obtain a target bone weight matrix comprises:

updating the bone weight matrix based on a difference between the real positions of the M vertices in the second video frame and the predicted positions of the M vertices, to obtain an updated bone weight matrix;

predicting the positions of the M vertices in the second video frame through the updated bone weight matrix and the bone rotation and translation matrix, to obtain second positions of the M vertices;

updating the bone rotation and translation matrix based on a difference between the real positions of the M vertices in the second video frame and the second positions of the M vertices, to obtain an updated bone rotation and translation matrix;

predicting the positions of the M vertices in the second video frame through the updated bone weight matrix and the updated bone rotation and translation matrix, to obtain third positions of the M vertices; and further updating the updated bone weight matrix again based on a difference between the real positions of the M vertices in the second video frame and the third positions of the M vertices, to obtain the target bone weight matrix.

15. The non-transitory computer-readable storage medium according to claim 13, wherein the predicting positions of the M vertices in a second video frame of the target video by using the bone weight matrix and the bone rotation and translation matrix, to obtain predicted positions of the M vertices comprises:

obtaining a position of a vertex i in the first video frame in a local space of the N bones, the vertex i being any vertex among the M vertices;

calculating a position of a vertex i in the second video frame of the target video in the local space of the N bones through the bone rotation and translation matrix and the position of the vertex i in the first video frame in the local space of the N bones; and calculating the position of the vertex i in the second video frame based on the position of the vertex i in the second video frame in the local space of the N bones and the bone weight matrix, to obtain a predicted position of the vertex i.

16. The non-transitory computer-readable storage medium according to claim 13, wherein the bone rotation and translation matrix comprises the amount of rotation and translation of each of the N bones in the first video frame, M being greater than N; and the obtaining a bone rotation and translation matrix of an object in a first video frame of a target video comprises:

determining a vertex k corresponding to a bone j based on a distance between the bone j and each of the M vertices, the vertex k being a vertex closest to the bone j among the M vertices, and the bone j being any one of the N bones;

establishing a mapping relationship between the bone j and the vertex k based on positions of the bone j and the vertex k in the first video frame; and obtaining an amount of rotation and translation of the vertex k in the first video frame, and determining an amount of rotation and translation of the bone j in the first video frame based on the amount of rotation and translation of the vertex k in the first video frame and the mapping relationship.

17. The non-transitory computer-readable storage medium according to claim 13, wherein the method further comprises:

obtaining a mesh model of the object, and constructing a topological data structure of the object based on the mesh model, the topological data structure being configured for indicating connectivity of the M vertices and a minimum hop count between connected vertices;

determining a set of neighbor vertices of the vertex i based on the topological data structure, the set of neighbor vertices of the vertex i comprising a vertex among the M vertices having a minimum hop count with the vertex i less than a hop count threshold, and the vertex i being any one of the M vertices; and setting the bone weight of the vertex i in the bone j to zero if the bone weight of the vertex i in the bone j is greater than 0 and the bone weight of each vertex in the set of neighbor vertices of the vertex i in the bone j is 0.

18. The non-transitory computer-readable storage medium according to claim 13, wherein the method further comprises:

setting a bone weight in the target bone weight matrix that is less than a first weight threshold to zero.

* * * * *